United States Patent
Korthals

(10) Patent No.: US 6,848,532 B2
(45) Date of Patent: Feb. 1, 2005

(54) TRANSMISSION CONTROL SYSTEMS

(75) Inventor: Douglas Dean Korthals, Crestwood, KY (US)

(73) Assignee: Deere & Company, Moline, IL (US)

( * ) Notice: Subject to any disclaimer, the term of this patent is extended or adjusted under 35 U.S.C. 154(b) by 136 days.

(21) Appl. No.: 10/063,811

(22) Filed: May 15, 2002

(65) Prior Publication Data

US 2003/0213639 A1 Nov. 20, 2003

(51) Int. Cl.$^7$ .............................................. B60K 17/10
(52) U.S. Cl. ...................................................... 180/367
(58) Field of Search ................................ 180/342, 343, 180/347, 349, 350, 357, 364, 366, 308, 367, 305, 307

(56) References Cited

U.S. PATENT DOCUMENTS

| | | | |
|---|---|---|---|
| 5,127,215 A | * | 7/1992 | Wenzel ........................ 56/11.1 |
| 5,848,520 A | * | 12/1998 | Arfstrom et al. ............. 56/11.4 |
| 6,454,032 B1 | * | 9/2002 | Teal et al. .................. 180/6.62 |
| 6,540,633 B1 | * | 4/2003 | Hasegawa et al. ............ 475/24 |

* cited by examiner

*Primary Examiner*—Faye M. Fleming
(74) *Attorney, Agent, or Firm*—Bell, Boyd & Lloyd, LLC

(57) ABSTRACT

A transmission control system, such as for a self-propelled, walk-behind lawn mower, is provided for controlling first and second hydrostatic transmissions in which each one of the transmissions has a hydraulic dump actuator and a brake actuator. The transmission control system includes a control lever and a linkage. The linkage is engaged with the control lever, the hydraulic dump actuators, and the brake actuators of the first and second hydrostatic transmissions. The control lever and the linkage have a drive position which place both of the hydraulic dump actuators in a drive mode, a neutral position which place both of the hydraulic dump actuators in a neutral mode, and a brake position which place both of the brake actuators in a brake mode. The transmission control system can have a shift slot pattern which defines the drive, neutral, and brake positions of the control lever.

12 Claims, 4 Drawing Sheets

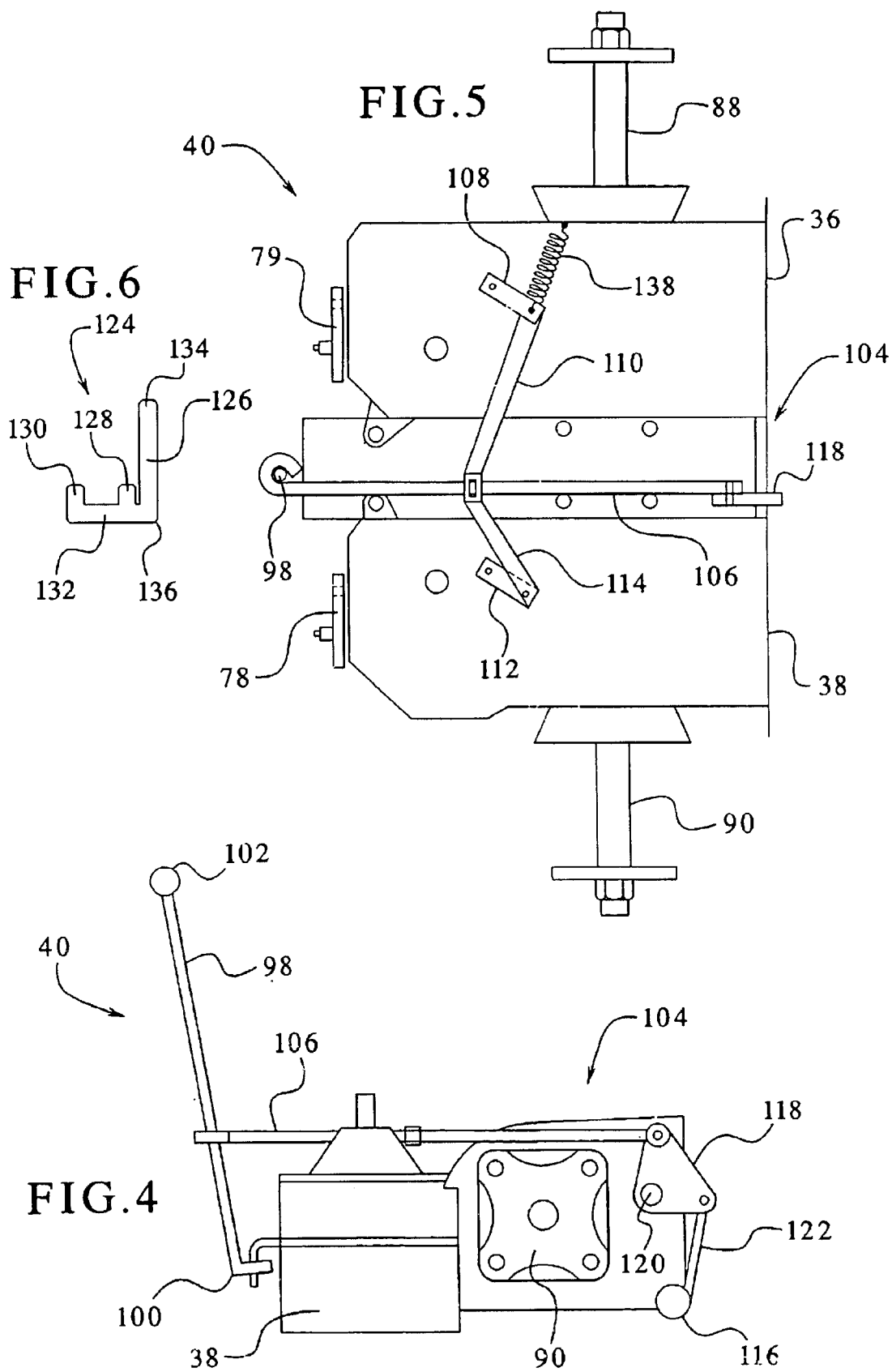

TRANSMISSION CONTROL SYSTEMS

BACKGROUND OF THE INVENTION

The present invention generally pertains to transmission control systems and methods of controlling transmissions. More specifically, the present invention pertains to transmission control systems and methods which concurrently control multiple transmissions. In a more specific embodiment, the present invention pertains to multi-function control levers and methods in which a single operator actuated control lever controls two hydrostatic transmissions in a synchronized manner. The present invention can be used, for example, with a walk-behind, self-propelled lawn mower.

Motorized vehicles generally include a transmission which transmits engine power to drive wheels for propelling the vehicle. For example, existing zero turn radius walk-behind lawn mowers typically include dual hydrostatic drives powered by an engine to drive two drive wheels. Each hydrostatic drive drives a single drive wheel.

Each hydrostatic drive typically includes a hydrostatic pump connected to a hydrostatic motor by hydraulic lines. Accordingly, the zero radius turn lawn mowers have two separate hydrostatic pumps connected to two separate hydrostatic motors through a complex system of high pressure hoses, oil filters, cooling reservoirs and various interconnecting hydraulic lines. Each of the hydrostatic drives is controlled by operator controls.

The operator controls for each hydrostatic drive are separate control systems. In other words, there are two sets of operator controls, one set of operator controls for each of the hydrostatic drives and associated drive wheel. The operator controls for each hydrostatic drive include separate drive and neutral controls for each hydrostatic pump and a separate brake lever for each hydrostatic drive. Accordingly, there are numerous separate hand operated controls for the drive, neutral, and brake lock functions of the hydrostatic drives. The numerous controls require substantial experience for the operator to operate the drive systems and thus operate the lawn mowers. It can be quite difficult for operators to operate the equipment efficiently and skillfully. For example, the operator has to actuate separate controls for the two hydrostatic drives to place both hydrostatic drives in a desired mode, such as a drive mode, a neutral mode, or a brake mode.

Furthermore, numerous hydraulic components, such as hydraulic hoses and fittings, are required for the separate hydrostatic drives. The numerous hydraulic components can be subject to leaks and high maintenance. Additionally, manufacturing costs are relatively high because of the numerous hydraulic components.

SUMMARY OF THE INVENTION

Transmission control systems and methods of controlling transmissions are provided by the present invention. The transmission control systems and methods can concurrently control multiple transmissions. For example, a single multi-function control lever can be actuated by an operator to control two hydrostatic transmissions in a synchronized manner.

In an embodiment, the present invention is directed to a self-propelled, walk behind lawn mower. The lawn mower has two integrated hydrostatic drive systems (hydrostatic transmissions), each drive system driving a drive wheel to propel the lawn mower. A transmission control system is provided which controls both of the hydrostatic transmissions or drive systems. The transmission control system can simultaneously place both transmissions in a selected mode or condition of (1) park brake with hydraulic pressure dumped, (2) free-wheeling neutral with hydraulic pressure dumped, and (3) hydraulic pressure active for propelling the lawn mower.

An advantage of the present invention is to provide improved transmission control systems and methods.

Another advantage of the present invention is to easily control multiple hydrostatic transmissions in synchronized manner.

A further advantage of the present invention is to allow an operator to control multiple transmissions by actuation of a single actuator.

Yet another advantage of the present invention is to provide a multi-function control lever that controls two hydrostatic transmissions of a self-propelled, walk-behind lawn mower.

An even further advantage of the present invention is to concurrently place multiple hydrostatic transmissions in a selected mode of neutral, drive, and brake with a single operator actuator.

Additional features and advantages of the present invention are described in, and will be apparent from, the following Detailed Description of the Invention and the figures.

BRIEF DESCRIPTION OF THE DRAWINGS

FIG. 4 is partial side elevational view of a dual hydrostatic transmission of the walk-behind lawn mower of FIG. 1 and having the transmission control system.

FIG. 5 is a top plan view of the dual hydrostatic transmission of FIG. 4.

FIG. 6 is an enlarged schematic view of a slot pattern for a control lever of the transmission control system of FIG. 1.

DETAILED DESCRIPTION OF THE INVENTION

The present invention generally pertains to transmission control systems and methods of controlling transmissions. More specifically, the present invention pertains to transmission control systems and methods which concurrently control multiple transmissions. In a more specific embodiment, the present invention pertains to multi-function control levers and methods in which a single operator actuated control lever controls two hydrostatic transmissions in a synchronized manner. One embodiment of the present invention will be described with reference to a self-propelled walk-behind lawn mower. However, the present invention can be embodied in many different forms.

Figure 1:
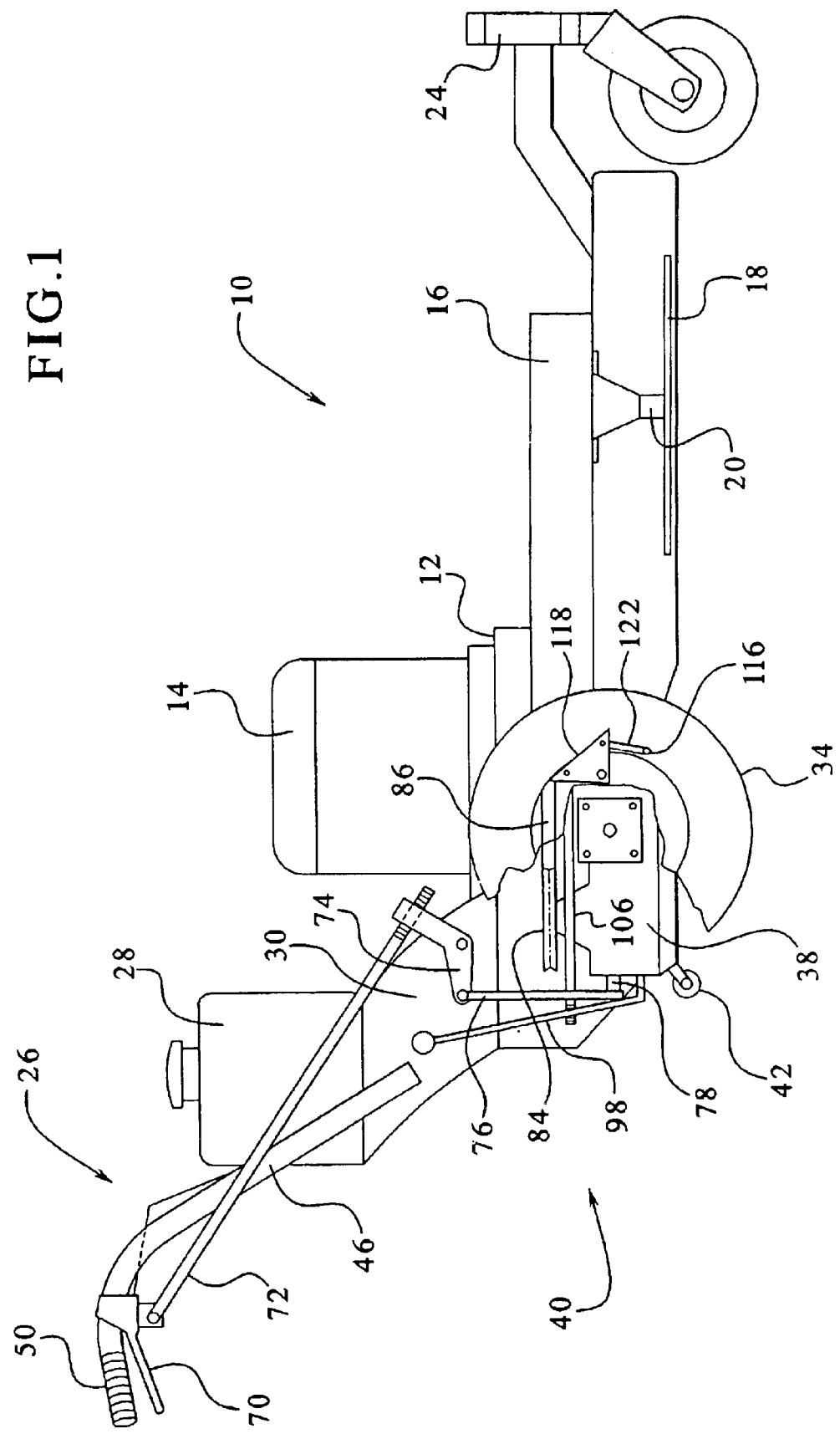
FIG. 1 is a side elevational, partial cut-away view of a self-propelled, walk-behind lawn mower having a transmission control system according to the present invention.
Figure 2:
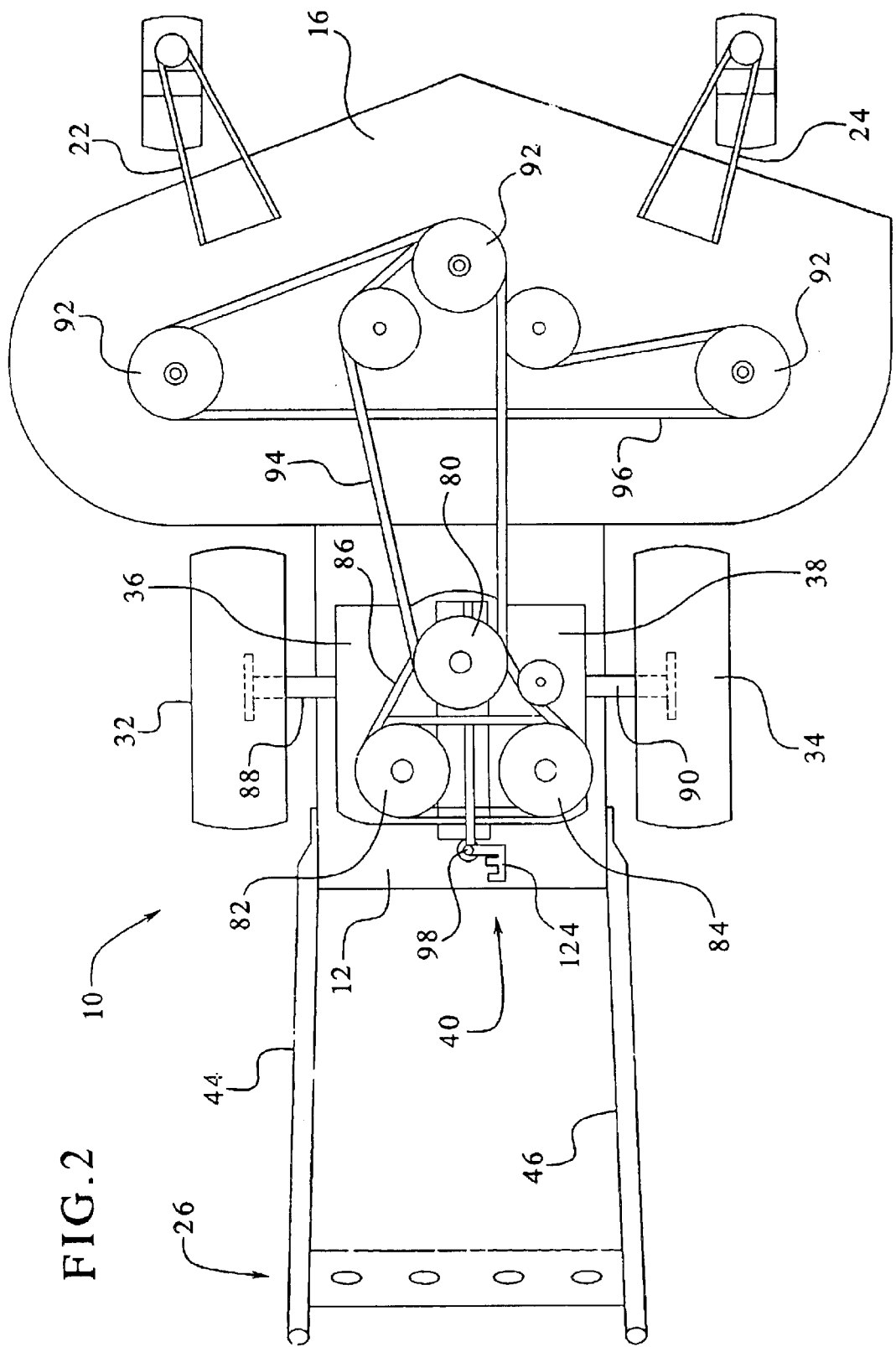
FIG. 2 is a top plan view of a portion of the walk-behind lawn mower of FIG. 1.

FIGS. 1 and 2 show a self-propelled walk-behind lawn mower 10 having a transmission control system according to the principles of the present invention.

The lawn mower 10 has a rear deck 12 supporting an engine 14 for propelling the lawn mower 10. The lawn mower 10 also has a forward deck 16 containing a plurality of cutting blades 18 for cutting grass and other plants. The cutting blades 18 are mounted to shafts 20 for rotation during cutting. Left and right caster wheel assemblies 22, 24 are provided at the front end of the forward deck 16 to support the forward deck 16 on ground terrain. A handle bar assembly 26 is attached to the rear deck 12. A fuel tank 28 for the engine 14 is mounted on brackets 30 which extend from the rear deck 12.

The rear deck 12 is supported by right and left rear drive wheels 32, 34. The left and right rear drive wheels 32, 34 are powered by the engine 14 for propelling the lawn mower 10 forward, reverse, and through turns. The engine 14 is coupled to two integrated hydrostatic transmissions 36, 38 which are coupled to the left and right drive wheels 32, 34. A transmission control system 40 is provided to control the two hydrostatic transmissions 36, 38. The hydrostatic transmissions 36, 38 and the transmission control system 40 will be further described below. One or more rollers 42 are provided below the hydrostatic transmissions 36, 38 for their protection and to reduce curb scuffing.

Figure 3:
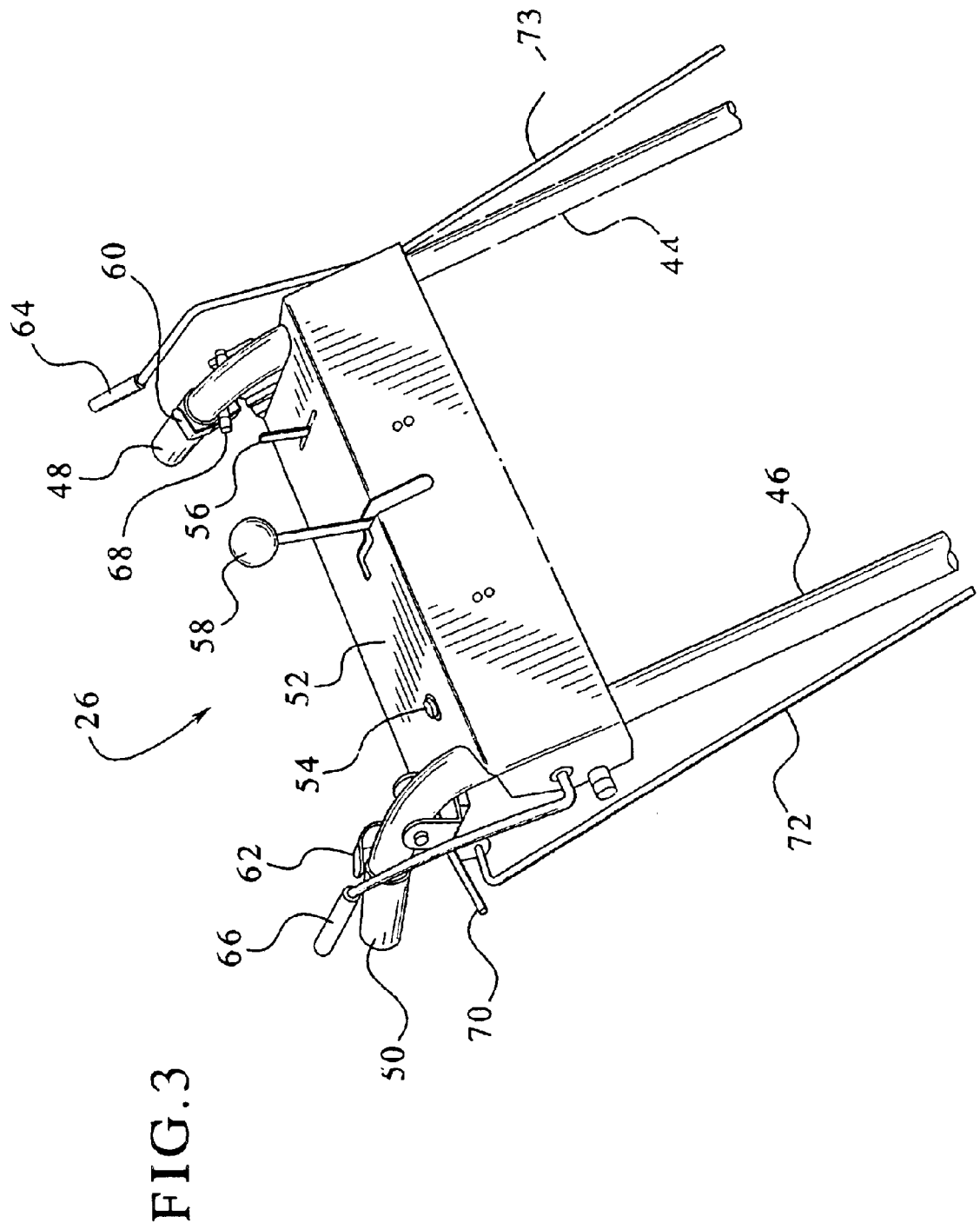
FIG. 3 is a perspective view of a control console of the walk-behind lawn mower of FIG. 1.

Referring to FIGS. 1 and 3, the handle bar assembly 26 extends upwardly and rearwardly from the rear deck 12. The handle bar assembly 26 is provided for the user to maneuver and control and otherwise operate the lawn mower 10. The handle bar assembly 26 has a pair of handle bar supports 44, 46 which are mounted to and extend from the rear deck 12. Hand grips 48, 50 are attached to the upper end of the handle bar supports 44, 46 which can be grasped by the operator during operation of the lawn mower 10.

The upper portion of the handle bar assembly 26 has various operator controls for operating portions of the lawn mower 10. A control panel 52 is supported by the handle bar supports 44, 46 and has an engine ignition control 54 for starting the engine 14, a throttle control 56 for controlling the speed of the engine, and a maximum drive speed control 58 for limiting the maximum drive speed. Neutral thumb latches 60, 62 are provided near the hand grips 48, 50. Operator presence controls 64, 66 are also provided near the hand grips 48, 50. The operator presence controls 64, 66 are grasped by the operator during use of the lawn mower and when the operator presence controls 64, 66 are released the cutting blades 18 stop rotating and/or the engine 14 is turned off for safety.

Variable speed control levers 68, 70 are provided below the hand grips 48, 50 and are actuated by the operator to control the speed and direction of the right and left drive wheels 32, 34. The right variable speed control lever 70 is coupled to a long link 72 which is coupled to a bell crank 74. The bell crank 74 is also coupled to a link 76 which is coupled to a speed and direction control lever 78 of the right-side hydrostatic transmission 38. When the operator actuates the right-side variable speed control lever 70, the speed and direction of the right drive wheel 34 is controlled by the right-side hydrostatic transmission 38. Similarly, the left-side variable speed control lever 68 is connected to a long link 73 which is connected to a bell crank which is connected to a link which is connected to a speed and direction control lever 79 (FIG. 5) of the left-side hydrostatic transmission 36. The left-side variable speed control lever 68 operates the speed and direction of the left-side hydrostatic transmission 36 which controls the speed and direction of the left-side drive wheel 32.

Referring to FIGS. 1 and 2, the left and right hydrostatic transmissions 36, 38 are mounted to the lawn mower 10 below the rear deck 12. The engine 14 drives an engine pulley 80 which drives left and right hydrostatic transmission drive pulleys 82, 84 by a belt 86. The left and right hydrostatic drive pulleys 82, 84 are connected to their respective left and right hydrostatic transmissions 36, 38. More specifically, the left drive pulley 82 is connected to a variable displacement hydraulic pump of the left hydraulic transmission 36. The left hydraulic transmission 36 also has a fixed displacement hydraulic motor coupled to the hydraulic pump. The hydraulic motor of the left hydraulic transmission 36 is connected to a left axle 88 of the left drive wheel 32 for example, by an integrated hydrostatic transaxle or gear reduction mechanism. Similarly, the right drive pulley 84 is connected to a variable displacement hydraulic pump of the right hydraulic transmission 38 which is coupled to a fixed displacement hydraulic motor of the right hydrostatic transmission 38. The right-side hydraulic motor is connected to a right axle 90 which drives the right drive wheel 34 for example, by an integrated hydrostatic transaxle or gear reduction mechanism. In this manner, power from the engine 14 is supplied to the hydrostatic transmissions 36, 38 and the drive wheels 32, 34.

The engine drives another engine pulley (not shown) below the engine pulley 80. The second engine pulley drives a plurality of blade spindle pulleys 92 by belts 94 and 96. The blade spindle pulleys 92 are connected to the cutting blade shafts 20. In this manner, the engine 12 supplies power to the cutting blades 18.

Referring to FIGS. 4 and 5, an embodiment of the transmission control system 40 is shown in greater detail. In this embodiment, the invention is part of a zero-turning radius, self-propelled, walk-behind lawn mower 10 with dual hydrostatic transmissions 36, 38 coupled to the rear drive wheels 32, 34. The dual hydrostatic transmissions 36, 38 are controlled by a single multi-function control lever 98. The multi-function control lever 98 can be shifted to several positions to simultaneously place both of the hydrostatic transmissions 36, 38 in a desired mode or condition. For example, the control lever 98 can be moved to a position that places the transmissions 36, 38 in a drive mode, a neutral mode, and a park brake mode. The drive mode can also function as a dynamic braking mode, for example, by limiting the downhill speed of the lawn mower 10.

This example of the multi-function control lever 98 is pivotally mounted to the lawn mower 10 at 100. A knob handle 102 can be provided for a convenient hand grip for the operator. The multi-function control lever 98 is engaged with a linkage 104 which is engaged with both hydrostatic transmissions 36, 38. The linkage 104 has a main link 106 engaged with the multi-function control lever 98. The main link 106 is connected to a hydraulic dump or by-pass lever 108 of the left hydrostatic transmission 36 by a link 10. Similarly, the main link 106 is connected to a hydraulic dump or by-pass lever 112 of the right hydrostatic transmission 38 by a link 114. The main link 106 is also connected to brake actuators 116 of the left and right hydrostatic transmissions 36, 38, for example, by a bell crank 118 which pivots at 120 and a link 122. Accordingly, the multi-function control lever 98, is connected to or engaged with the hydraulic dump actuators 108, 112 and the brake actuators 116 of both of the hydrostatic transmissions 36, 38. Because the multi-function control lever 98 is operatively connected to the dump and brake actuators 108, 112, 116 of both hydrostatic transmissions 36, 38, the control lever 98 concurrently controls both of the transmissions 36, 38 with a single control lever or actuator.

Referring also to FIGS. 2 and 6, the multi-function control lever 98 can extend through a shift pattern 124. The shift pattern 124 can conveniently provide positions for the control lever 98 that places the hydrostatic transmissions 36, 38 in particular modes. The example of the shift pattern 124 shown in FIG. 6 includes a drive slot 126, a neutral slot 128, a park brake slot 130, and a transition slot 132 connecting the slots together. When the multi-function control lever 98 is placed in the position 134 in the drive slot 126, the hydraulic dump actuators 108, 112 of the transmissions 36, 38 are closed and the hydrostatic transmissions 36, 38 can drive the drive wheels 32, 34. The rate and direction of hydraulic fluid flow, and thus the speed and direction in the drive wheels 32, 34, is controlled by the variable speed control levers 68, 70. When the multi-function control lever 98 is moved to and held in the position 136 of the drive slot 126, the dump actuators 108, 112 are in their dump open positions and the transmissions 36, 38 are in neutral. The drive wheels 32, 34 are free to rotate in this neutral position. The multi-function control lever 98 must be manually held in the neutral position 136 in the drive slot 126. However, the control lever 98 can be moved to the neutral slot 128 to place the transmissions 36, 38 in neutral mode and the control lever 98 will remain in the neutral slot 128 without manual assistance from the operator. The operator can move the multi-function control lever 98 to the park brake slot 130 which places the dump actuators 108, 112 in their dump open positions and places the brake actuators 56 in their park brake on positions to apply the transmission parking brakes.

A mechanism can be provided to retain the multi-function control lever in any desired position in the shift pattern 124. For example, a biasing device 138, such as a spring, can be provided to hold the control lever 98 in the drive position, neutral position, and the brake position. The spring 138 is shown in FIG. 4 as connected to the dump lever 108 and the link 110; however, the biasing member 138 can be provided anywhere in the transmission control system 40 as desired.

The embodiment of the transmission control system 40 is shown and described as the multi-function control lever 98 engaged with various links which are engaged with the appropriate actuators of the hydrostatic transmissions 36, 38, i.e. mechanical linkages. However, the present invention can be practiced in various other embodiments. For example, one or more components of the transmission control system 40 could be hydraulic, electrical, computer controlled, and combinations thereof.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A transmission control system for controlling first and second hydrostatic transmissions, each one of the transmissions having a hydraulic dump actuator and a brake actuator, the transmission control system comprising:
   at least one single control lever; and
   a linkage which operatively couples the single control lever to:
      (a) both of the hydraulic dump actuators; and
      (b) both of the brake actuators,
   wherein the single control lever is movable between a drive position which places both of the hydraulic dump actuators in a drive mode, a neutral position which places both of the hydraulic dump actuators in a neutral mode, and a brake position which places both of the brake actuators in a brake mode.

2. The transmission control system of claim 1, further comprising a shift slot pattern which defines the drive, neutral, and brake positions of the single control lever, the single control lever movably positioned in the shift slot pattern.

3. The transmission control system of claim 2, wherein the shift slot pattern further comprises a drive slot, a neutral slot, a brake slot, and a transition slot connected to the drive, neutral, and brake slots.

4. The transmission control system of claim 1, further comprising a position retaining member connected to at least one of the single control lever and the linkage, the position retaining member maintaining the single control lever in at least one selected position of the drive, neutral, and brake positions.

5. The transmission control system of claim 4, wherein the position retaining member further comprises a biasing member which biases the single control lever toward the at least one selected position.

6. The transmission control system of claim 1, wherein the linkage further comprises:
   a link engaged with the single control lever;
   a first dump link engaged with the link and the hydraulic dump actuator of the first hydrostatic transmission;
   a second dump link engaged with the link and the hydraulic dump actuator of the second hydrostatic transmission; and
   a brake link engaged with the link and the brake actuators of the first and second hydrostatic transmissions.

7. A mowing machine comprising:
   a first hydrostatic transmission operatively coupled to a first drive wheel, the first hydrostatic transmission having a hydraulic dump actuator and a brake actuator;
   a second hydrostatic transmission operatively coupled to a second drive wheel, the second hydrostatic transmission having a hydraulic dump actuator and a brake actuator;
   at least one single operator actuated transmission control lever; and
   a linkage which operatively couples the single operator actuated transmission control lever to: (a) the hydraulic dump actuators of the first and second hydrostatic transmissions; and (b) the brake actuators of the first and second hydrostatic transmission,
   the single operator actuated transmission control lever movable between a drive position which places both of the hydraulic dump actuators in a drive mode, a neutral position which places both of the hydraulic dump actuators in a neutral mode, and a brake position which places both of the brake actuators in a brake mode.

8. The mowing machine of claim 7, further comprising a shift slot pattern which defines the drive, neutral, and brake positions of the single operator actuated transmission control lever, the single operator actuated transmission control lever movably positioned in the shift slot pattern.

9. The mowing machine of claim 8, wherein the shift slot pattern further comprises a drive slot, a neutral slot, a brake slot, and a transition slot connected to the drive, neutral, and brake slots.

10. The mowing machine of claim 7, further comprising a position retaining member connected to at least one position of the single operator actuated transmission control lever and the linkage, the position retaining member maintaining the single operator actuated transmission control lever in at least one position of the drive, neutral, and brake positions.

11. The mowing machine of claim 10, wherein the position retaining member further comprises a biasing member which biases the single operator actuated transmission control lever toward the at least one position.

12. The mowing machine of claim 7, wherein the linkage further comprises:

a link engaged with the single operator actuated transmission control lever;

a first dump link engaged with the link and the hydraulic dump actuator of the first hydrostatic transmission;

a second dump link engaged with the link and the hydraulic dump actuator of the second hydrostatic transmission; and a brake link engaged with the link and the brake actuators of the first and second hydrostatic transmissions.

* * * * *